(12) United States Patent
Kim et al.

(10) Patent No.: US 9,403,690 B2
(45) Date of Patent: Aug. 2, 2016

(54) METHOD FOR PREPARATION OF MESOPOROUS ZEOLITES

(71) Applicants: SAMSUNG TOTAL PETROCHEMICALS CO., LTD., Chungcheongnam-do (KR); KOREA RESEARCH INSTITUTE OF CHEMICAL TECHNOLOGY, Daejeon (KR)

(72) Inventors: Jeong Rang Kim, Chungcheongnam-do (KR); Yeon Shick Yoo, Chungcheongnam-do (KR); Jin Suk Lee, Seoul (KR); Ho Sik Chang, Daejeon (KR); Yun Jo Lee, Daejeon (KR); Ki Won Jun, Daejeon (KR); Jo Yong Park, Daejeon (KR); Kyoung Su Ha, Daejeon (KR)

(73) Assignees: HANWHA TOTAL PETROCHEMICAL CO., LTD., Seosan-Si (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 557 days.

(21) Appl. No.: 13/974,154

(22) Filed: Aug. 23, 2013

(65) Prior Publication Data
US 2014/0056805 A1    Feb. 27, 2014

(30) Foreign Application Priority Data
Aug. 24, 2012    (KR) .................. 10-2012-0093008

(51) Int. Cl.
*C01B 39/02* (2006.01)
*C01B 39/38* (2006.01)
(52) U.S. Cl.
CPC .............. *C01B 39/38* (2013.01); *C01B 39/02* (2013.01)

(58) Field of Classification Search
CPC .................................. C01B 39/02; C01B 39/38
See application file for complete search history.

(56) References Cited

U.S. PATENT DOCUMENTS

| 5,069,890 A | 12/1991 | Dai et al. |
|---|---|---|
| 6,017,508 A | 1/2000 | Millar et al. |
| 6,565,826 B2 | 5/2003 | Jacobsen et al. |
| 6,669,924 B1 | 12/2003 | Kaliaguine et al. |
| 2014/0056805 A1 * | 2/2014 | Kim .................. C01B 39/38 423/709 |

FOREIGN PATENT DOCUMENTS

| EP | 0528494 | 5/1995 |
|---|---|---|
| EP | 1882676 | 1/2008 |
| WO | 2007/043731 | 4/2007 |

OTHER PUBLICATIONS

On et al., "Ultrastable and Highly Acidic, Zeolite-Coated Mesoporous Aluminosilicates", Angew. Chem. Int. Ed., 41 (6):1036-1040 (2002).
Verhoef et al., Partial Transformation of MCM-41 Material into Zeolites: Formation of Nanosized MFI Type Crystallites, Chem. Mater., 13(2):683-687 (2001).

* cited by examiner

*Primary Examiner* — David M Brunsman
(74) *Attorney, Agent, or Firm* — Harness, Dickey & Pierce, P.L.C.

(57) ABSTRACT

Provided is a preparation method for a mesoporous zeolite, particularly a method for preparing mesoporous zeolite through a simple process without using costly materials such as an organic amine template or a surfactant. The method includes 1) forming a synthetic zeolite gel by mixing a silica precursor, an aluminum precursor and water and aging the resulted mixture; 2) carrying out zeolite synthesis by subjecting the synthetic zeolite gel to a hydrothermal reaction; 3) cooling the synthesized zeolite from the above step 2), then adding a basic solution thereto and allowing them to react, thereby obtaining a mesoporous zeolite slurry; and 4) washing the mesoporous zeolite slurry with water, drying and firing it, thereby obtaining a mesoporous zeolite.

13 Claims, 2 Drawing Sheets

METHOD FOR PREPARATION OF MESOPOROUS ZEOLITES

FIELD OF THE INVENTION

Figure 1:
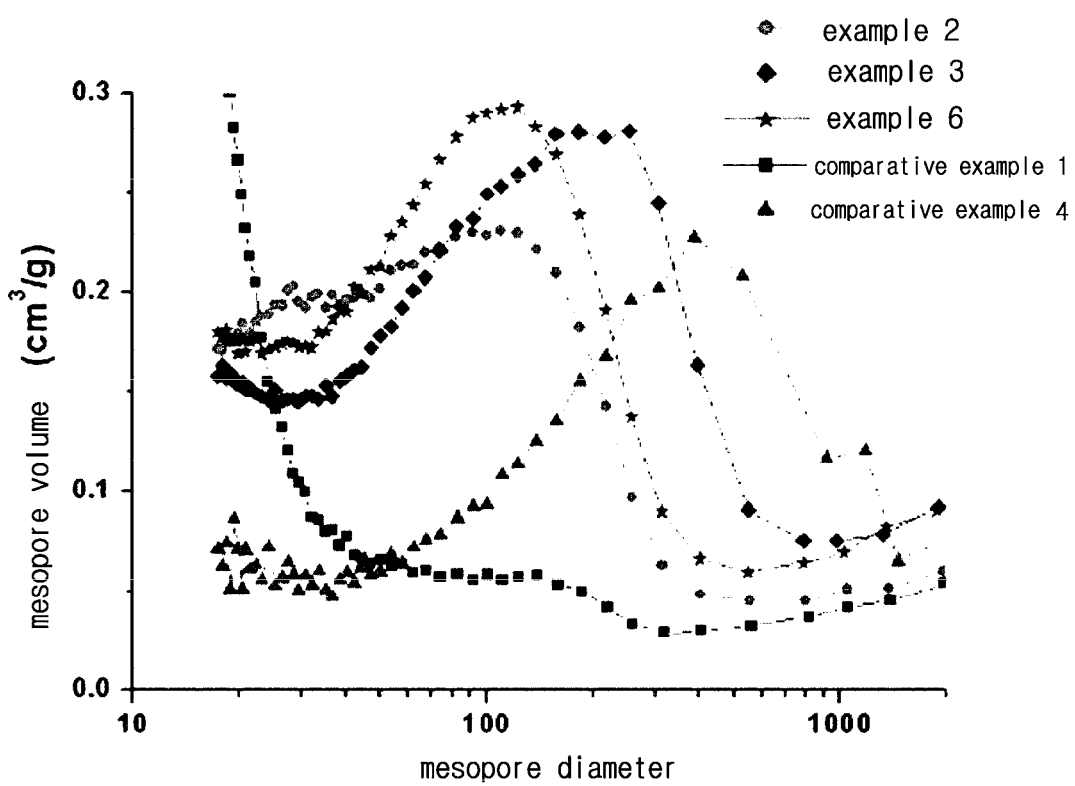

The present invention is directed to a preparation method of a mesoporous zeolite, particularly to a method for preparing a mesoporous zeolite through a simple process without using costly materials such as an organic amine template or a surfactant.

BACKGROUND OF THE INVENTION

Generally, zeolite is a crystalline aluminum silicate which has microspores having a molecular size of 0.2-2 nm, and is widely used in various applications such as a catalyst, an adsorbent, an ion exchanger, an absorbent, etc. owing to its pore characteristics and ion exchange functions. Particularly, when the zeolite is used as a catalyst or a catalyst support, the pore characteristics can have large influence on the catalyst performance. In zeolites having microspores, the transfer of molecules through pores via diffusion is very slow, thereby making the reaction slow, increasing side reactions or reducing the catalyst life. In order to solve such problems of the microporous zeolite, several attempts have been made, by making the zeolite crystal size smaller for increasing the exterior surface area, by reducing the transfer distance within the zeolite crystal, or by forming mesopores inside the zeolite crystal so as to allow the molecular transfer only through the mesopores while allowing the reaction only occurred in the micro spores.

When zeolite has mesopores simultaneously with microspores, the catalyst performance is improved as compared to the zeolite having only microspores, and particularly there are several advantages such as lengthened catalyst life and improved selectivity. When zeolites only have microspores, the distance for reactants or products to pass through the zeolite microspores is long, and it may result in side reactions or coke generation, leading to decrease in catalyst life and diffusion rate of molecules. In the meantime, in zeolites having mesopores, reactions occur mainly in the microspores and the transfer of materials (reactants or products) can be rapidly conducted through the mesopores adjacent to the microspores, thereby making the retention time of materials in microspores shorten, which results in excellent catalyst selectivity and increased catalyst life owing to the reduced coke generation. Zeolites only having microspores have a characteristic of participating in the reaction only on the surface of zeolite crystals, while zeolites having mesopores can participate in the catalyst reaction as the whole zeolite crystal and thus have high utility.

Various approaches have been made to prepare zeolites having mesopores. For example, provided is a method comprised of: synthesizing a material having regular mesopores and the inner wall of which consists of amorphous silica ($SiO_2$) or silica-alumina ($SiO_2$—$Al_2O_3$); impregnating the resulted material with a zeolite-templating compound, an organic amine; and subjecting the resulted product to hydrothermal synthesis so as to transform the amorphous inner wall into a zeolite crystal, thereby obtaining a zeolite material having mesopores (Chemistry of Materials 13(2001), pp. 683-687, U.S. Pat. No. 6,669,924). As another method, similar to the above-mentioned method of prior arts, a method comprising the steps of: impregnating an amorphous material with mesopores with zeolite seeds, instead of organic amine zeolite-templating compound of the first mentioned method; and subjecting the mesoporous inner wall to hydrothermal synthesis for zeolite crystallization so as to provide mesoporous zeolite, has been described (Angewandte Chemie International, 41 (2002), P1036-1040). Still as an alternative method, a method of preparing mesoporous zeolites has been described wherein an organic material as a template material is mixed into a source for zeolite synthesis such as Al, Si or the like and the mixture is subjected to hydrothermal synthesis (EP patent No. 1,882,676). As a fourth example, a method for preparing mesoporous zeolite using a surfactant having organosilan group has been described, wherein the silan group is bonded to the zeolite surface, and the long chain hydrocarbon attached to the silan group contributes to the mesopore formation (WO2007/043731, registered Korean patent No. 727, 288). As a fifth example, a method for preparing mesoporous zeolites has been described, wherein a template for mesopore formation such as activated charcoal is mixed with a synthetic zeolite gel and then the mixture is subjected to a hydrothermal synthesis (U.S. Pat. No. 6,565,826). As a sixth known example of prior arts, a method for introducing mesopores into zeolite crystals by dealumination or desilication of the zeolite has been described (U.S. Pat. No. 5,069,890, EP patent No. 0,528,494, U.S. Pat. No. 6,017,508).

However, the conventional methods as described above have problems such as complex process, high production cost and the like.

SUMMARY OF THE INVENTION

The object of the present invention is to overcome the problems of prior arts in mesoporous zeolite preparation such as use of costly organic amine templates or surfactants and complicated preparation processes which have been an obstacle to commercial applications. In this regard, the present invention provides a method for preparing mesoporous zeolites through a simple process at an affordable price without using organic amine templates or surfactants.

DETAILED DESCRIPTION OF THE INVENTION

The method for preparing a mesoporous zeolite according to the present invention is characterized by comprising: a first step of mixing compounds which contain elements (such as Si, Al, Na) required to zeolite synthesis, adjusting pH with the addition of an acid and aging the resulted product so as to form a synthetic zeolite gel; a second step of subjecting the synthetic zeolite gel to a hydrothermal reaction to synthesize a zeolite; a third step of cooling the synthesized zeolite from the above second step to an appropriate temperature, then adding a basic solution thereto so as to form mesopores; and a fourth step of subjecting the mesoporous zeolite slurry to a series of processes of washing with water, drying and firing, resulting in a mesoporous zeolite.

More specifically, the method for preparing a mesoporous zeolite according to the present invention is characterized by comprising:

1) forming a synthetic zeolite gel by mixing a silica precursor, an aluminum precursor and water and aging the resulted mixture;
2) carrying out zeolite synthesis by subjecting the synthetic zeolite gel to a hydrothermal reaction;
3) cooling the synthesized zeolite from the above step 2), then adding a basic solution thereto and allowing them to react, thereby obtaining a mesoporous zeolite slurry; and
4) washing the mesoporous zeolite slurry with water, drying and firing it, thereby obtaining a mesoporous zeolite.

In the step 1), after mixing a silica precursor, an aluminum precursor and water, if desired, an acid may be added for adjusting pH before aging the mixture.

The silica precursor can be those generally used in this field of art and thus do not specifically limited by their species, however, particularly, at least one selected from tetraethyl orthosilicate (TEOS), silica sol, silica gel, sodium silicate and fumed silica may be used as for the silica precursor.

The aluminum precursor can be those generally used in this field of art and thus do not specifically limited by their species, however, for example, at least one selected from aluminum alkoxide, sodium aluminate ($NaAlO_2$), aluminum sulfate ($Al_2(SO_4)_3$), aluminum chloride ($AlCl_3$), boehmite (AlOOH) and aluminum hydroxide ($Al(OH)_3$) may be used as for the aluminum precursor.

When sodium element is not sufficiently contained in the silica precursor or aluminum precursor, a sodium precursor may be further separately added, and the sodium precursor may be at least one selected from sodium hydroxide (NaOH), sodium carbonate ($Na_2CO_3$), sodium bicarbonate ($NaHCO_3$), sodium chloride (NaCl) and sodium sulfate ($Na_2SO_4$).

The molar ratio of the silicon precursor and aluminum precursor (Si/Al) is preferably in the range of 20-60. When it is less than 20, the formation of mesopores in a zeolite becomes difficult disadvantageously, and when it is more than 60, the size of mesopores becomes too large or the yield of a zeolite having mesopores becomes lowered. Therefore, the molar ratio of Si/Al is preferably maintained in the above range.

In the step 1), a zeolite having the same crystal structure to the finally targeted zeolite may be further added as a seed, for enhancing the crystallinity of the zeolite and promoting the crystallization. The theoretical amount of the seed used at this time may be within the range of 0.1-30 wt % based on the yield of a zeolite.

In the above step 1), after mixing a silica precursor and an aluminum precursor, if necessary, a sodium precursor, a zeolite seed and water, when pH of the solution is higher than 11.0-12.0, the pH may be adjusted by using an acid. As for the acid which may be used at this time, at least one of inorganic acids such as sulfuric acid, hydrochloric acid, nitric acid, phosphoric acid or organic acids such as acetic acid ($CH_3COOH$), formic acid (HCOOH) may be used without limitation.

In the above step 1), the step of aging the synthetic zeolite gel is needed for achieving the desired purity of zeolite, enhancing the crystallinity and production yield, and reducing a reaction time, wherein the aging step is preferably carried out at a temperature range of 20-120° C. for 1-24 hours. When the aging temperature or period is lower than the said ranges, aging cannot be sufficiently achieved, resulting in reduced zeolite crystallinity or poor purity, and when the aging temperature is too high or the aging time is excessively long, the resulting zeolite crystal can become larger, disadvantageously. Therefore, in this regard, it is preferred to maintain the said ranges herein.

In the above step 2) of the method for preparing the mesoporous zeolite according to the present invention, the temperature for the hydrothermal reaction of said synthetic zeolite gel may be varied depending on the crystalline structure of a zeolite or Si/Al molar ratio, etc. Although it is not specifically limited, preferably, the reaction temperature is for example 100-200° C., and the reaction period is 1-7 hours. When the temperature is less than 100° C. or the period is less than 1 hour, the time required for crystallization becomes too long; and when the temperature is more than 200° C. or the period is more than 7 hours, the purity of the resulting crystal can be hardly adjusted and the crystal size becomes too large, disadvantageously.

The hydrothermal reaction may be carried out with or without stirring, preferably with stirring.

In the above step 3) of the method for preparing the mesoporous zeolite according to the present invention, the reactor for zeolite synthesis is cooled to 100° C. or less for cooling the zeolite synthesized in the above step 2), and then a basic solution is added thereto, stirred and allowed to react at the temperature of 20-100° C. so as to partially dissolve the silica component constituting the zeolite backbone by the basic solution and thus form mesopores. The base used in this step is not particularly limited, and hydroxide or carbonate of alkali metal or alkali earth metal may be mainly used, for example at least one selected from NaOH, KOH, CsOH, LiOH, $Ca(OH)_2$, $Na_2CO_3$ and the like, wherein the hydroxide may be used alone and the carbonate is preferably used in combination with hydroxide owing to its low basicity when being used alone.

The Si/Al molar ratio of the synthetic zeolite used in the above step 3), which was synthesized in the step 2), is preferably 20-60. As the aluminum ions can form a good binding with silicon oxides, it binds to the surface of the silicon oxide and adjust the dissolution of silicon oxide by the base, thereby serving to make the mesoporous formation in the zeolite uniform. In this respect, the Si/Al molar ratio of the zeolite used in the above step 3) is preferably 20-60 for forming mesopores.

The amount of the base used in the above step 3) is 0.05-0.5 moles, preferably 0.1-0.3 moles, based on 1 mole of the silica precursor used. When the molar ratio is less than 0.05, mesopores are not sufficiently formed in the zeolite, and when it is more than 0.5, the silica component which constitutes the zeolite backbone dissolves too much by the excessive use of base and thus the yield of mesoporous zeolite is lowered, disadvantageously. Therefore, it is preferable to maintain said range.

The step 4) in the method for preparing a mesoporous zeolite according to the present invention is to subject the mesoporous zeolite slurry obtained from the above step 3) to the series of processes of washing, drying and firing so as to prepare a mesoporous zeolite, finally. For example, washing may be carried out by filtration, centrifugation, sedimentation washing and the like, and specifically it is possible to carry out the filtration or sedimentation washing more easily by adjusting pH to neutral with an acid so as to cohere the zeolite or the small amount of the non-reacted particles.

For using the mesoporous zeolite prepared by the above-described method as catalyst or adsorbent, it is possible to form a zeolite, wherein the zeolite formation can be carried out by the conventional method of prior arts using a binder including such as pelletizing, extrusion, spray-dry and the like.

The mesoporous zeolite prepared by the method for preparing a mesoporous zeolite according to the present invention has average mesopore size of 5-50 nm m and the mesopore volume may be 0.1-1.0 cc/g.

BRIEF DESCRIPTION OF THE INVENTION

FIG. 1 represents the pore distribution in zeolites determined from the nitrogen adsorption-desorption patterns of zeolites prepared by Examples 2, 3 and 6, and Comparative examples 1 and 4, respectively.

Figure 2:
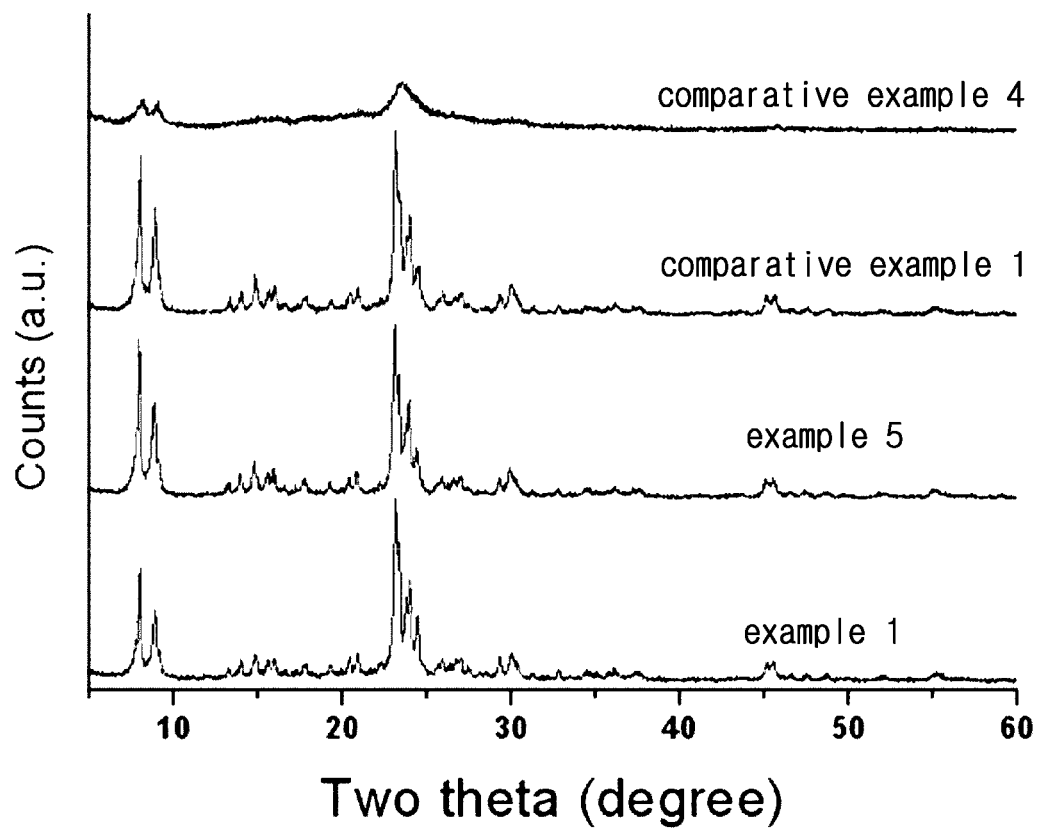

FIG. 2 is X-ray diffraction (XRD) analysis results of zeolites prepared by Examples 1 and 5, and Comparative examples 1 and 4.

DETAILED EMBODIMENTS OF THE INVENTION

The present invention is further illustrated by way of the following examples, which are not intended to limit the scope of the present invention.

Example 1

A solution in which the silica component from silica sol was dissolved was prepared by: dissolving 12.0 g of sodium silicate ($Na_2SiO_3$, $SiO_2$ 36.6 wt % and $Na_2O$ 18 wt %) into 80 g of distilled water; adding thereto 16.5 g of a silica sol (Ludox AS-40, $SiO_2$ 40 wt %); and heating it at 95° C. for 10 hours. To the resulted solution, a solution in which 1.1 g of aluminum sulfate ($Al_2(SO_4)_3 \cdot 9H_2O$) was dissolved in 42 g of distilled water was added and mixed together with vigorous stirring. To the resulted solution, 0.6 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.5. The resulted slurry was aged at 50° C. for 5 hours, then placed in an autoclave, and subjected to a hydrothermal reaction in an oven at 180° C. for 20 hours so as to synthesize a zeolite.

The synthesized zeolite slurry was cooled to 80° C., then mixed together with an aqueous solution in which 1.1 g of sodium hydroxide (NaOH, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 and FIG. 2 as follows, and the product was found out to be ZSM-5 with a single phase having a MFI structure according to the XRD results. The characteristics of zeolite pore was further analyzed by using a nitrogen adsorption-desorption isotherm, and the results were shown in Table 1.

Example 2

A solution in which the silica component from silica sol was dissolved was prepared by: dissolving 15.3 g of sodium silicate ($Na_2SiO_3$, $SiO_2$ 36.6 wt % and $Na_2O$ 18 wt %) into 80 g of distilled water; adding thereto 13.5 g of a silica sol (Ludox AS-40, $SiO_2$ 40 wt %); and heating it at 90° C. for 10 hours. To the resulted solution, a solution in which 1.6 g of aluminum sulfate ($Al_2(SO_4)_3 \cdot 9H_2O$) was dissolved in 42 g of distilled water was added and mixed together with vigorous stirring. To the resulted solution, 0.4 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.7. The resulted slurry was aged at 50° C. for 5 hours, then placed in an autoclave, and subjected to a hydrothermal reaction in an oven at 190° C. for 15 hours so as to synthesize a zeolite.

The synthesized zeolite slurry was cooled to 80° C., then mixed together with an aqueous solution in which 0.9 g of sodium hydroxide (NaOH, 98%) was dissolved by stirring, and maintained at 80° C. for 3 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a MFI structure according to the XRD results. The characteristics of zeolite pore was further analyzed by using a nitrogen adsorption-desorption isotherm, and the results were shown in Table 1 and FIG. 1.

Example 3

A solution in which the silica component from silica sol was dissolved was prepared by: dissolving 18.7 g of sodium silicate ($Na_2SiO_3$, $SiO_2$ 36.6 wt % and $Na_2O$ 18 wt %) into 80 g of distilled water; adding thereto 10.4 g of a silica sol (Ludox AS-40, $SiO_2$ 40 wt %); and heating it at 85° C. for 10 hours. To the resulted solution, a solution in which 2.7 g of aluminum sulfate ($Al_2(SO_4)_3 \cdot 9H_2O$) was dissolved in 42 g of distilled water was added and mixed together with vigorous stirring. To the resulted solution, 1.2 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.5. The resulted slurry was aged at 50° C. for 5 hours, then placed in an autoclave, and subjected to a hydrothermal reaction in an oven at 180° C. for 20 hours so as to synthesize a zeolite.

The synthesized zeolite slurry was cooled to 80° C., then mixed together with an aqueous solution in which 1.4 g of sodium hydroxide (NaOH, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a typical MFI structure according to the XRD results. The characteristics of zeolite pore was further analyzed by using a nitrogen adsorption-desorption isotherm, and the results were shown in Table 1 and FIG. 1.

Example 4

A solution in which the silica component from silica sol was dissolved was prepared by: dissolving 18.7 g of sodium silicate ($Na_2SiO_3$, $SiO_2$ 36.6 wt % and $Na_2O$ 18 wt %) into 80 g of distilled water; adding thereto 10.4 g of a silica sol (Ludox AS-40, $SiO_2$ 40 wt %); and heating it at 75° C. for 10 hours. To the resulted solution, a solution in which 3.2 g of aluminum sulfate ($Al_2(SO_4)_3 \cdot 9H_2O$) was dissolved in 42 g of distilled water was added and mixed together with vigorous stirring. To the resulted solution, 0.7 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.4. The resulted slurry was aged at 70° C. for 4 hours, then placed in an autoclave, and subjected to a hydrothermal reaction in an oven at 180° C. for 20 hours so as to synthesize a zeolite.

The synthesized zeolite slurry was cooled to 80° C., then mixed together with an aqueous solution in which 1.3 g of sodium hydroxide (NaOH, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a MFI structure according to the XRD results. The characteristics of zeolite pore was further analyzed by using a nitrogen adsorption-desorption isotherm, and the results were shown in Table 1.

Example 5

A solution in which the silica component from silica sol was dissolved was prepared by: dissolving 11.3 g of sodium silicate ($Na_2SiO_3$, $SiO_2$ 36.6 wt % and $Na_2O$ 18 wt %) into 80 g of distilled water; adding thereto 17.0 g of a silica sol (Ludox AS-40, $SiO_2$ 40 wt %); and heating it at 95° C. for 10 hours. To the resulted solution, a solution in which 0.8 g of aluminum sulfate ($Al_2(SO_4)_3 \cdot 9H_2O$) was dissolved in 42 g of distilled water was added and mixed together with vigorous stirring. To the resulted solution, 0.8 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.7. The resulted slurry was aged at 70° C. for 4 hours, then placed in an autoclave, and subjected to a hydrothermal reaction in an oven at 180° C. for 20 hours so as to synthesize a zeolite.

The synthesized zeolite slurry was cooled to 80° C., then mixed together with an aqueous solution in which 1.3 g of sodium hydroxide (NaOH, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 and FIG. 2 as follows, and the product was found out to be ZSM-5 with a single phase having a typical MFI structure according to the XRD results. The characteristics of zeolite pore was further analyzed by using a nitrogen adsorption-desorption isotherm, and the results were shown in Table 1.

Example 6

A solution in which the silica component from silica sol was dissolved was prepared by: dissolving 12.6 g of sodium silicate ($Na_2SiO_3$, $SiO_2$ 36.6 wt % and $Na_2O$ 18 wt %) into 80 g of distilled water; adding thereto 15.9 g of a silica sol (Ludox AS-40, $SiO_2$ 40 wt %); and heating it at 75° C. for 10 hours. To the resulted solution, a solution in which 0.8 g of aluminum sulfate ($Al_2(SO_4)_3 \cdot 9H_2O$) was dissolved in 42 g of distilled water was added and mixed together with vigorous stirring. To the resulted solution, 0.8 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.8. The resulted slurry was aged at 70° C. for 4 hours, then placed in an autoclave, and subjected to a hydrothermal reaction in an oven at 170° C. for 36 hours so as to synthesize a zeolite.

The synthesized zeolite slurry was cooled to 80° C., then mixed together with an aqueous solution in which 1.3 g of sodium hydroxide (NaOH, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a typical MFI structure according to the XRD results. The characteristics of zeolite pore was further analyzed by using a nitrogen adsorption-desorption isotherm, and the results were shown in Table 1 and FIG. 1.

Example 7

A solution in which the silica component from silica sol was dissolved was prepared by: dissolving 11.4 g of sodium silicate ($Na_2SiO_3$, $SiO_2$ 36.6 wt % and $Na_2O$ 18 wt %) into 80 g of distilled water; adding thereto 17.0 g of a silica sol (Ludox AS-40, $SiO_2$ 40 wt %); and heating it at 85° C. for 5 hours. To the resulted solution, a solution in which 0.5 g of aluminum sulfate ($Al_2(SO_4)_3 \cdot 9H_2O$) was dissolved in 42 g of distilled water was added and mixed together with vigorous stirring. To the resulted solution, 0.8 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.3. The resulted slurry was aged at 60° C. for 4 hours, then placed in an autoclave, and subjected to a hydrothermal reaction in an oven at 180° C. for 20 hours so as to synthesize a zeolite.

The synthesized zeolite slurry was cooled to 80° C., then mixed together with an aqueous solution in which 1.5 g of sodium hydroxide (NaOH, 98%) and 0.13 g of sodium aluminate ($NaAlO_2$, $Na_2O$=31.0-35.0 wt %, $Al_2O_3$=34.0-39.0 wt %) were dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a typical MFI structure according to the XRD results. The characteristics of zeolite pore was further analyzed by using a nitrogen adsorption-desorption isotherm, and the results were shown in Table 1.

Example 8

A solution in which the silica component from silica sol was dissolved was prepared by: dissolving 16.5 g of sodium silicate ($Na_2SiO_3$, $SiO_2$ 36.6 wt % and $Na_2O$ 18 wt %) into 80 g of distilled water; adding thereto 12.4 g of a silica sol (Ludox AS-40, $SiO_2$ 40 wt %); and heating it at 75° C. for 10 hours. To the resulted solution, a solution in which 1.6 g of aluminum sulfate ($Al_2(SO_4)_3 \cdot 9H_2O$) was dissolved in 42 g of distilled water was added and mixed together with vigorous stirring. To the resulted solution, 0.6 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.5. The resulted slurry was aged at 70° C. for 4 hours, then placed in an autoclave, and subjected to a hydrothermal reaction in an oven at 170° C. for 36 hours so as to synthesize a zeolite.

The synthesized zeolite slurry was cooled to 80° C., then mixed together with an aqueous solution in which 1.4 g of sodium hydroxide (NaOH, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a typical MFI structure according to the XRD results. The characteristics of zeolite pore was further analyzed by using a nitrogen adsorption-desorption isotherm, and the results were shown in Table 1.

Example 9

A solution in which the silica component from silica sol was dissolved was prepared by: dissolving 18.7 g of sodium silicate ($Na_2SiO_3$, $SiO_2$ 36.6 wt % and $Na_2O$ 18 wt %) into 80 g of distilled water; adding thereto 10.4 g of a silica sol (Ludox AS-40, $SiO_2$ 40 wt %); and heating it at 75° C. for 10 hours. To the resulted solution, a solution in which 2.1 g of aluminum sulfate ($Al_2(SO_4)_3 \cdot 9H_2O$) was dissolved in 42 g of distilled water was added and mixed together with vigorous stirring. To the resulted solution, 0.6 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.5. The resulted slurry was aged at 60° C. for 5 hours, then placed in an autoclave, and subjected to a hydrothermal reaction in an oven at 180° C. for 16 hours so as to synthesize a zeolite.

The synthesized zeolite slurry was cooled to 80° C., then mixed together with an aqueous solution in which 1.5 g of potassium hydroxide (KOH, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a MFI structure according to the XRD results. The characteristics of zeolite pore was further analyzed by using a nitrogen adsorption-desorption isotherm, and the results were shown in Table 1.

Comparative Example 1

A solution in which the silica component from silica sol was dissolved was prepared by: dissolving 18.7 g of sodium silicate ($Na_2SiO_3$, $SiO_2$ 36.6 wt % and $Na_2O$ 18 wt %) into 80 g of distilled water; adding thereto 10.4 g of a silica sol (Ludox AS-40, $SiO_2$ 40 wt %); and heating it at 80° C. for 5 hours. To the resulted solution, a solution in which 2.1 g of aluminum sulfate ($Al_2(SO_4)_3 \cdot 9H_2O$) was dissolved in 42 g of distilled water was added and mixed together with vigorous stirring. To the resulted solution, 0.6 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.5. The resulted slurry was aged at 60° C. for 4 hours, then placed in an autoclave, and subjected to a hydrothermal reaction in an oven at 180° C. for 20 hours so as to synthesize a zeolite.

The synthesized zeolite slurry was cooled at an ambient temperature without any specific treatment with a base, filtered and washed with a sufficient amount of distilled water. The washed zeolite was dried at 110° C. and fired at 500° C. to form a microporous type zeolite.

The production yield of zeolite was determined by weighing thus obtained product and X-ray diffraction (XRD) analysis was conducted; the results thereof were shown in Table 1 and FIG. 2 as follows, and the product was found out to be ZSM-5 with a single phase having a typical MFI structure according to the XRD results. The characteristics of zeolite pore was further analyzed by using a nitrogen adsorption-desorption isotherm, and the results were shown in Table 1 and FIG. 1.

Comparative Example 2

A solution in which the silica component from silica sol was dissolved was prepared by: dissolving 18.7 g of sodium silicate ($Na_2SiO_3$, $SiO_2$ 36.6 wt % and $Na_2O$ 18 wt %) into 80 g of distilled water; adding thereto 10.4 g of a silica sol (Ludox AS-40, $SiO_2$ 40 wt %); and heating it at 75° C. for 10 hours. To the resulted solution, a solution in which 2.1 g of aluminum sulfate ($Al_2(SO_4)_3 \cdot 9H_2O$) was dissolved in 42 g of distilled water was added and mixed together with vigorous stirring. To the resulted solution, 0.6 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.5. The resulted slurry was aged at 70° C. for 4 hours, then placed in an autoclave, and subjected to a hydrothermal reaction in an oven at 180° C. for 20 hours so as to synthesize a zeolite.

The synthesized zeolite slurry was cooled to 80° C., then mixed together with an aqueous solution in which 0.4 g of sodium hydroxide (NaOH, 98%) was dissolved by stirring, and maintained at 80° C. for 5 hours. The zeolite slurry prepared in the above was cooled at an ambient temperature, filtered and washed with a sufficient amount of distilled water. The washed zeolite was dried at 110° C. and fired at 500° C. to form a zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a typical MFI structure according to the XRD results. The characteristics of zeolite pore was further analyzed by using a nitrogen adsorption-desorption isotherm, and the results were shown in Table 1.

Comparative Example 3

A solution in which the silica component from silica sol was dissolved was prepared by: dissolving 18.7 g of sodium silicate ($Na_2SiO_3$, $SiO_2$ 36.6 wt % and $Na_2O$ 18 wt %) into 80 g of distilled water; adding thereto 10.4 g of a silica sol (Ludox AS-40, $SiO_2$ 40 wt %); and heating it at 75° C. for 10 hours. To the resulted solution, a solution in which 2.1 g of aluminum sulfate ($Al_2(SO_4)_3 \cdot 9H_2O$) was dissolved in 42 g of distilled water was added and mixed together with vigorous stirring. To the resulted solution, 0.6 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.4. The resulted slurry was aged at 70° C. for 4 hours, then placed in an autoclave, and subjected to a hydrothermal reaction in an oven at 180° C. for 20 hours so as to synthesize a zeolite.

The synthesized zeolite slurry was cooled to 80° C., then mixed together with an aqueous solution in which 4.8 g of sodium carbonate ($Na_2CO_3$, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 as follows, and the product was found out to be ZSM-5 with a single phase having a MFI structure according to the XRD results. The characteristics of zeolite pore was further analyzed by using a nitrogen adsorption-desorption isotherm, and the results were shown in Table 1.

Comparative Example 4

A solution in which the silica component from silica sol was dissolved was prepared by: dissolving 18.7 g of sodium silicate ($Na_2SiO_3$, $SiO_2$ 36.6 wt % and $Na_2O$ 18 wt %) into 80 g of distilled water; adding thereto 10.4 g of a silica sol (Ludox AS-40, $SiO_2$ 40 wt %); and heating it at 75° C. for 10 hours. To the resulted solution, a solution in which 2.1 g of aluminum sulfate ($Al_2(SO_4)_3 \cdot 9H_2O$) was dissolved in 42 g of distilled water was added and mixed together with vigorous stirring. To the resulted solution, 0.6 g of HZSM-5 (MFI structure, Zeolyst) as a zeolite seed was added and mixed together. To the resulted solution, a solution of sulfuric acid ($H_2SO_4$, 98%) in 20 g of distilled water was mixed with stirring so as to bring pH to 11.4. The resulted slurry was aged at 70° C. for 4 hours, then placed in an autoclave, and subjected to a hydrothermal reaction in an oven at 180° C. for 20 hours so as to synthesize a zeolite.

The synthesized zeolite slurry was cooled to 80° C., then mixed together with an aqueous solution in which 5.5 g of sodium hydroxide (NaOH, 98%) was dissolved by stirring, and maintained at 80° C. for 5 hours. The mesoporous zeolite slurry prepared in the above was cooled at an ambient temperature, filtered and washed with a sufficient amount of distilled water. The washed zeolite was dried at 110° C. and fired at 500° C. to form a mesoporous zeolite.

The production yield of zeolite was determined by weighing thus obtained product and X-ray diffraction (XRD) analysis was conducted; the results thereof were shown in Table 1 and FIG. 2 as follows, and the product was found out to be a mixture of mainly amorphous silica and a small amount of ZSM-5 according to the XRD results. The characteristics of zeolite pore was further analyzed by using a nitrogen adsorption-desorption isotherm, and the results were shown in Table 1 and FIG. 1.

TABLE 1

| Exam. No. | Zeolite morphology[1] | Zeolite yield[2], % | Nitrogen adsorption-desorption test results[3] | | | |
|---|---|---|---|---|---|---|
| | | | BET specific surface area[4], $m^2/g$ | specific surface area of mesopores[5], $m^2/g$ | Pore volume of mesopores[6], cc/g | Average pore diameter[7], nm |
| Example 1 | ZSM-5 | 89 | 441.9 | 193.5 | 0.4 | 7.3 |
| Example 2 | ZSM-5 | 91 | 414 | 173.7 | 0.32 | 7.7 |
| Example 3 | ZSM-5 | 87 | 477.9 | 185.4 | 0.54 | 6.5 |
| Example 4 | ZSM-5 | 88 | 400.5 | 145.8 | 0.4 | 9.9 |
| Example 5 | ZSM-5 | 89 | 457.2 | 174.6 | 0.49 | 10.1 |
| Example 6 | ZSM-5 | 90 | 436.5 | 161.1 | 0.38 | 9.5 |
| Example 7 | ZSM-5 | 91 | 425.7 | 178.2 | 0.37 | 8.5 |
| Example 8 | ZSM-5 | 93 | 390.6 | 98.1 | 0.15 | 5.5 |
| Example 9 | ZSM-5 | 86 | 468.9 | 207.9 | 0.56 | 9.7 |
| Comp. example 1 | ZSM-5 | 98 | 351.6 | 11.2 | 0.05 | 11.6 |
| Comp. example 2 | ZSM-5 | 97 | 361.6 | 15.3 | 0.08 | 10.7 |
| Comp. example 3 | ZSM-5 | 98 | 354.6 | 12.1 | 0.06 | 11.5 |
| Comp. example 4 | ZSM-5 | 46 | 426.6 | 134.9 | 0.36 | 22.7 |

[1] Crystal structure and crystallinity determined by X-ray diffraction (XRD) patterns

[2] (theoretically anticipated zeolite weight − obtained zeolite weight)/theoretically anticipated zeolite weight × 100

[3] Determined by a nitrogen adsorption-desorption isotherm under liquid nitrogen at a temperature of −196° C.

[4] Specific surface area of zeolites determined by BET (Brunauer-Emmett-Teller) method

[5] Specific surface area of mesopores determined by BJH (Barrett-Joyner-Halenda) method using nitrogen adsorption to mesopores ranged between 1.7-350 nm

[6] BJH pore volume determined by nitrogen adsorption to mesopores ranged between 1.7-350 nm

[7] BJH pore average diameter determined by nitrogen adsorption

As seen from the above Table 1, the analysis results of the mesoporous zeolites prepared by the present invention (Examples 1-9) show that the BET specific surface area which corresponds to the total specific surface area of the zeolites, and the specific surface area and the pore volume in the mesopore area are large. In the meantime, in the case of no mesopore formation treatment (comparative example 1); the case of using only small amount of a strong basic solution that is used in mesopore formation treatment (comparative example 2); the case of using only weak basic solution (comparative example 3), mesopores were hardly formed, resulting in the specific surface area and the pore volume in the mesopore area smaller as compared to Examples according to the present invention. In the case of comparative example 4 in which a strong basic solution was used for mesopore formation, but at a large amount, although mesopores were formed, there are several problems that the amount of zeolite dissolved by the strong base was large; amorphous silica were generated, thereby lowering the yield of the mesoporous zeolite; and the zeolite crystallinity was decreased.

Therefore, it is found that the object of the present invention can be achieved only when mesoporous zeolite is prepared by a method according to the present invention.

INDUSTRIAL AVAILABILITY

According to the method of the present invention, it is possible to prepare a mesoporous zeolite through a rather simple process with raw materials of a moderate price, without using expensive materials such as an organic amine template or a surfactant. Therefore, the mesoporous zeolite prepared by the present invention shows good molecular transfer properties and thus excellent catalytic performance, as compared to the zeolite from prior arts which only has micropores, thereby having a good commercial use at a moderate price as a catalyst or adsorbent.

Particularly, the mesoporous zeolites according to the present invention have a short length for molecular diffusion in micropores and a rapid material transfer through mesopores thereby facilitating the adsorption-desorption rate of molecules and ensuring the excellent performances as an adsorbent; the mesoporous zeolite of the present invention can also be advantageously used as a catalyst or catalyst support, since it can increase the selectivity of a catalytic reaction and the catalyst life owing to great resistance to a catalytic poison such as a coke.

What is claimed is:

1. A method for preparing a mesoporous zeolite comprising:
   1) forming a synthetic zeolite gel by mixing a silica precursor, an aluminum precursor and water and aging the resulted mixture;
   2) carrying out zeolite synthesis by subjecting the synthetic zeolite gel to a hydrothermal reaction;
   3) cooling the synthesized zeolite from the above step 2), then adding a basic solution wherein the amount of a base in the form of the basic solution is 0.05-0.5 moles per mole of the silica precursor thereto and allowing them to react, thereby obtaining a mesoporous zeolite slurry; and
   4) washing the mesoporous zeolite slurry with water, drying and firing it, thereby obtaining a mesoporous zeolite.

2. The method according to claim 1, further comprising a step of adjusting pH to 11.0-12.0 by adding an acid, after mixing the silica precursor, the aluminum precursor and water, and before aging the mixture in the above step 1).

3. The method according to claim 2, wherein the acid is at least one selected from the group consisting of sulfuric acid, hydrochloric acid, nitric acid, phosphoric acid, acetic acid and formic acid.

4. The method according to claim 1, further comprising adding and mixing a sodium precursor and a zeolite seed in the above step 1).

5. The method according to claim 4, wherein the sodium precursor is at least one selected from the group consisting of sodium hydroxide, sodium carbonate, sodium bicarbonate and sodium sulfate.

6. The method according to claim 1, wherein the silica precursor is at least one selected from the group consisting of tetraethylorthosilicate, silica sol, silica gel, sodium silicate and fumed silica, and the aluminum precursor is at least one selected from the group consisting of aluminum alkoxide, sodium aluminate, aluminum sulfate, aluminum chloride, boehmite and aluminum hydroxide.

7. The method according to claim 1, wherein the molar ratio of the silicon precursor to the aluminum precursor (Si/Al) is 20-60.

8. The method according to claim 1, wherein the aging process in the above step 1) is conducted at 20-120° C. for 1-24 hours.

9. The method according to claim 1, wherein the hydrothermal reaction of the zeolite synthetic gel in the above step 2) is conducted at a temperature range of 100-200° C. for the reaction period of 1-7 hours.

10. The method according to claim 1, wherein the above step 3) is carried out by cooling the zeolite to 100° C. or less, adding thereto a basic solution, stirring together and reacting it at 20-100° C.

11. The method according to claim 1, wherein the basic solution is prepared from at least one base selected from the group consisting of NaOH, KOH, CsOH, LiOH, $Ca(OH)_2$ and $Na_2CO_3$.

12. The method according to claim 1, wherein the Si/Al molar ratio in the zeolite in the above step 3), which is synthesized from the step 2), is 20-60.

13. The method according to claim 1, wherein the average mesopore size of the mesoporous zeolite obtained from the above step 4) is in the range of 5-50 nm and volume thereof is 0.1-1.0 cc/g.

* * * * *